US011599874B2

(12) United States Patent
Tu (10) Patent No.: US 11,599,874 B2
(45) Date of Patent: Mar. 7, 2023

(54) RAPID APPROVAL OF BLOCKCHAIN-BASED TRANSACTIONS

(71) Applicant: Aldelo, LP, Pleasanton, CA (US)

(72) Inventor: Harry Tu, Pleasanton, CA (US)

(73) Assignee: Aldelo, LP, Pleasanton, CA (US)

( * ) Notice: Subject to any disclaimer, the term of this patent is extended or adjusted under 35 U.S.C. 154(b) by 233 days.

(21) Appl. No.: 16/921,805

(22) Filed: Jul. 6, 2020

(65) Prior Publication Data

US 2022/0005022 A1 Jan. 6, 2022

(51) Int. Cl.
*G06Q 20/36* (2012.01)
*G06K 7/10* (2006.01)
*G06Q 20/38* (2012.01)
*G06Q 20/40* (2012.01)
*G06Q 20/42* (2012.01)
*G06Q 20/20* (2012.01)
*G06Q 40/02* (2023.01)
(Continued)

(52) U.S. Cl.
CPC ..... *G06Q 20/3674* (2013.01); *G06F 16/2379* (2019.01); *G06K 7/10722* (2013.01); *G06K 7/1413* (2013.01); *G06K 7/1417* (2013.01); *G06Q 20/02* (2013.01); *G06Q 20/108* (2013.01); *G06Q 20/202* (2013.01); *G06Q 20/204* (2013.01); *G06Q 20/3224* (2013.01); *G06Q 20/3276* (2013.01); *G06Q 20/3278* (2013.01); *G06Q 20/3676* (2013.01); *G06Q 20/389* (2013.01); *G06Q 20/3829* (2013.01); *G06Q 20/4015* (2020.05); *G06Q 20/4037* (2013.01); *G06Q 20/42* (2013.01); *G06Q 30/0185* (2013.01); *G06Q 40/02* (2013.01); *H04L 9/30* (2013.01)

(58) Field of Classification Search
None
See application file for complete search history.

(56) References Cited

U.S. PATENT DOCUMENTS 8,886,570 B1 * 11/2014 Amancherla .......... G06Q 20/40
235/382
11,068,895 B2 * 7/2021 Kinagi ............... G06Q 20/4015
(Continued)

OTHER PUBLICATIONS

Chen et al (Blockchain-based Payment Collection Supervision System using Pervasive Bitcoin Digital Wallet) (Year: 2017).*
(Continued)

*Primary Examiner* — Mamon Obeid
(74) *Attorney, Agent, or Firm* — Fish & Richardson P.C.

(57) ABSTRACT

The present disclosure involves systems, software, and computer implemented methods for providing rapid approval of blockchain-based transactions. This includes approval of transactions prior to the transaction being written to the blockchain. A transaction system can register with a transaction manager, such as a cloud-based or cloud transaction manager, which can maintain a queue of pending transactions and provide approval for transactions in real-time or near real-time, while later verifying the pending transactions are written into the blockchain as expected. This allows the transaction system to securely confirm the transaction is approved prior to the transaction being written in the blockchain, based on a real-time or near real-time analysis of each customer's corresponding account and transactions.

20 Claims, 4 Drawing Sheets

(51) Int. Cl.
  *G06Q 20/10*   (2012.01)
  *G06Q 30/018*  (2023.01)
  *G06Q 20/32*   (2012.01)
  *G06F 16/23*   (2019.01)
  *H04L 9/30*    (2006.01)
  *G06K 7/14*    (2006.01)
  *G06Q 20/02*   (2012.01)

(56) References Cited

U.S. PATENT DOCUMENTS

| | | | |
|---|---|---|---|
| 11,087,293 B1* | 8/2021 | Yan | G06Q 20/389 |
| 11,277,474 B2* | 3/2022 | Ramsay | H04L 67/1097 |
| 2012/0290478 A1* | 11/2012 | Crofts | G06Q 40/00 |
| | | | 705/44 |
| 2015/0120539 A1* | 4/2015 | Amancherla | G06Q 20/3676 |
| | | | 705/41 |
| 2019/0220621 A1* | 7/2019 | Chan | G06Q 40/00 |
| 2019/0236594 A1* | 8/2019 | Ehrlich-Quinn | H04L 9/3263 |
| 2019/0287082 A1* | 9/2019 | Song | H04L 9/0637 |
| 2020/0099512 A1* | 3/2020 | Kikinis | H04L 9/3297 |
| 2022/0005022 A1* | 1/2022 | Tu | H04L 9/3239 |
| 2022/0058637 A1* | 2/2022 | Yan | H04L 9/32 |

OTHER PUBLICATIONS

Poon et al., "The Bitcoin Lightning Network: Scalable Off-Chain Instant Payments", The Bitcoin Lightning Paper, dated Jan. 2016, 59 pages.

International Search Report and Written Opinion in International Appln. No. PCT/US2021/035472, dated Sep. 10, 2021, 10 pages.

* cited by examiner

RAPID APPROVAL OF BLOCKCHAIN-BASED TRANSACTIONS

TECHNICAL FIELD

This disclosure generally relates to computer-implemented methods, software, and systems for providing approval for blockchain-based transactions prior to the transaction being written to the blockchain, thus enabling rapid blockchain-based transactions.

BACKGROUND

Blockchain systems write new blocks of transactions to the blockchain only periodically (e.g., every 10 seconds, or 10 minutes, etc.). Thus, a recipient of a transaction is not assured their transaction is complete until the next block is updated.

SUMMARY

The present disclosure involves systems, software, and computer implemented methods for providing approval for blockchain-based transactions prior to the transaction being written to the blockchain. A first example method includes receiving at a cloud transaction manager a transaction request payload message. The transaction request payload message can include a transaction identifier, a desired amount, a first entity identifier, and a transaction type. The cloud transaction manager receives, from a client digital wallet, a request for approval of a transaction, the request for approval including the transaction identifier and a public key of a digital asset stored within the client digital wallet. The cloud transaction manager identifies a pending transaction amount associated with the digital asset and determines an available balance of the digital asset. If the available balance is at least equal to the desired transaction amount, sending, from the cloud transaction manager, a request to a client digital wallet to initiate persistence of the transaction to a blockchain. Receiving, by the cloud transaction manager, a confirmation message from the client digital wallet and in response approving the transaction, sending a transaction approval message to the first entity, prior to the approved transaction being written to the blockchain, updating a pending transaction queue associated with the digital asset, performing a verification that the approved transaction is written to the blockchain, and if the verification is successful, removing the approved transaction from the pending transaction queue.

Implementations can optionally include one or more of the following features.

In some instances, the pending transaction amount is identified from the pending transaction queue and the pending transaction queue is maintained by the cloud transaction manager. In some instances, the first entity is a merchant point-of-sale system and is registered with the cloud transaction manager In some instances, the available balance is determined by subtracting the pending transaction amount from a current balance of the client digital asset associated with the blockchain, and the current balance of the digital asset is determined using the public key of the digital asset.

In some instances, if the available balance is less than the desired transaction amount, the cloud transaction manager denies the transaction.

In some instances, if the cloud transaction manager fails to, or is otherwise unable to, verify that the approved transaction is written to the blockchain, the cloud transaction manager can place the client digital wallet on a blacklist which prevents further transactions from the client digital wallet.

In some instances, the client digital wallet is associated with a mobile device, and the request for approval of the transaction includes location information of the mobile device which is compared to a location of the first entity.

In some instances, the transaction request payload message includes date and time data associated with the transaction.

In some instances, the transaction identifier is transmitted to the client digital wallet by the scanning of a bar code or QR code using an imaging sensor associated with the mobile device. In some instances, the transaction identifier is transmitted to the client digital wallet via near-field communications (NFC).

Similar operations and processes may be performed in a non-transitory computer-readable medium storing instructions which, when executed, cause at least one processor to perform the operations. Additionally, similar operations can be associated with or provided as computer-implemented software embodied on tangible, non-transitory media that processes and transforms the respective data; some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description, drawings, and the claims.

DETAILED DESCRIPTION

This disclosure describes a system for providing rapid approval of blockchain-based transactions. These approvals include approval of transactions prior to the transaction being written to the blockchain. In other words, approval can be provided to merchants and customers in an accelerated manner based on information stored in a remote or cloud-based system, which can approve the transaction without requiring the transaction to be fully committed to the blockchain, thereby increasing the speed and usability of blockchain-based transactions.

A blockchain provides a transparent, immutable record of transactions via a distributed ledger. This ensures that the proper owner of a blockchain asset (e.g., a cryptocurrency) is readily verifiable by anyone with access to the blockchain, as long as all transactions by the owner have been written to the blockchain. Conventionally, many blockchains wait a predetermined period of time, aggregating transactions before writing the new transaction in a block to the blockchain. This period of time can range from, for example, one to two minutes, to 10-15 minutes. In many implementations, this delay between when a transaction is made to when it is written in the blockchain is too long. For example, a retail point-of-sale (POS) merchant system (e.g., a grocery store checkout register) generally cannot wait 2-15 minutes to approve each sale. Often, any process that takes longer than 10 seconds will be prohibitively slow, and an overall transaction of within three seconds is desirable. The merchant system can register with a transaction manager, such as a cloud-based or cloud transaction manager, which can maintain a queue of pending transactions and provide approval for transactions in real-time or near real-time, while later verifying the pending transactions are written into the blockchain as expected. This allows the merchant system (or any payee device) to securely confirm the transaction is approved prior to the transaction being written in the blockchain, based on a real-time or near real-time analysis of each customer's corresponding account and transactions.

In one example implementation, if a customer wants to purchase a cup of coffee at a shop using cryptocurrency, the merchant system of the coffee shop can verify and approve the transaction as follows. The merchant system can be registered with a cloud transaction manager, which allows the merchant to send transaction and payment information to the cloud transaction manager. Upon the customer and the merchant agreeing on a transaction (e.g., the purchase of a cup of coffee for $2.00), the merchant system can transmit a transaction request payload message to the cloud transaction manager. The transaction request payload message can contain a transaction identifier (e.g., a globally unique identifier (GUID), a 9-digit alphanumeric code, etc.) which uniquely identifies the transaction, a transaction amount, date, time, transaction type (e.g., sale, purchase, refund, loan, etc.), and a merchant identifier which uniquely identifies the merchant (and, in some cases, a particular location associated with the merchant) awaiting approval of the transaction.

The merchant system can then communicate a set of transaction details to a client device associated with the customer (e.g., the customer's mobile phone, tablet, or other device). The transaction details can include, for example, the transaction identifier, as well as other pertinent details (such as a price/amount, date/time, etc.) to assist the customer, using the client device, to accept or approve the transaction. In some implementations, the merchant system communicates or exchanges information with the client device via a QR code or bar code scanned by the client device. In some implementations, the merchant system communicates via wireless or wireline communications (e.g., Bluetooth, NFC, USB, Wi-Fi, SMS, etc.).

Upon customer approval, the client device can send an approval request message to the cloud transaction manager. In some instances, this can be done via a digital wallet of the client device. The approval request message can include the transaction identifier and a public key of the digital asset (e.g., cryptocurrency) stored within the digital wallet, which can allow the cloud transaction manager to verify with the blockchain assets owned by the digital wallet. The cloud transaction manager can confirm that the transaction identifier in the approval request message matches the transaction identifier provided by the merchant system, and can then verify a balance of a digital asset stored within the digital wallet in the blockchain using the public key of the digital asset. Further, the cloud transaction manager can identify pending transactions associated with the digital assets in the digital wallet that have not been written to their respective blockchain yet. In some implementations, the pending transactions are identified using a pending transaction queue that is maintained and updated by the cloud transaction manager. In some implementations, the cloud transaction manager can require that the digital wallet conforms to a particular protocol or execute specific action to ensure the cloud transaction manager is able to accurately maintain the pending transaction queue. In some implementations, the pending transaction queue can be generated and maintained by a third party or external system, where the cloud transaction manager queries the external system for information about particular transactions. With both the pending transactions and balance in the blockchain, the cloud transaction manager is able to confirm that the digital wallet has an available balance sufficient to complete the transaction and can transmit a message back to the client device instructing the client device to initiate the transaction with the blockchain, or otherwise commit to the transaction.

The client device, using the digital wallet, can initiate the transaction with the associated blockchain and can send a confirmation message to the cloud transaction manager indicating that the transaction has been initiated and will be written to the blockchain by the blockchain network. Upon receipt of this message, the cloud transaction manager can assume the digital wallet has complied and approve the transaction, and send an approval message to the merchant system. The merchant system, upon receipt of the approval message, can indicate the transaction is approved and, for example, can print a receipt for the customer. The cloud transaction manager can then add the transaction to the pending transaction queue and begin monitoring the blockchain for the next block to be written. In some implementations, the cloud transaction manager adds the transaction to the pending transaction queue simultaneously, or nearly simultaneously with sending the approval message to the merchant system. It should be noted that the entire process, from the approval request message to an approval received at the merchant system can occur in a short amount of time (e.g., less than 3 seconds) which can allow blockchain transactions to be used for rapid, retail or POS transactions.

Once a new block is written to the blockchain, the cloud transaction manager can verify that the previously approved transaction is recorded in the blockchain using the public key of a digital asset stored within the digital wallet. If the approved transaction is recorded or otherwise persisted in the blockchain, the cloud transaction manager can then remove it, or archive it, from the pending transaction queue. If the approved transaction has not been recorded or persisted after an expected timeframe has passed, the cloud transaction manager can take additional action. In some instances, the digital wallet might have falsified its confirmation message, and can be blacklisted or otherwise flagged, preventing future transactions/interaction with the cloud transaction manager until the outstanding debt is paid. Alternatively, the writing operation may have failed, and further investigation may be performed, or the cloud transaction manager may send a message to initiate a re-attempt of the write process. Additionally, the cloud transaction manager can notify or alert the merchant system or appropriate regulatory services. In some implementations, when particular digital wallets, or merchant systems have been determined to be performing malicious activity, or otherwise not acting in accordance with policies determined by the cloud transaction manager, the cloud transaction manager can block those merchant systems or digital wallets, refusing to provide further approval services.

Figure 1:
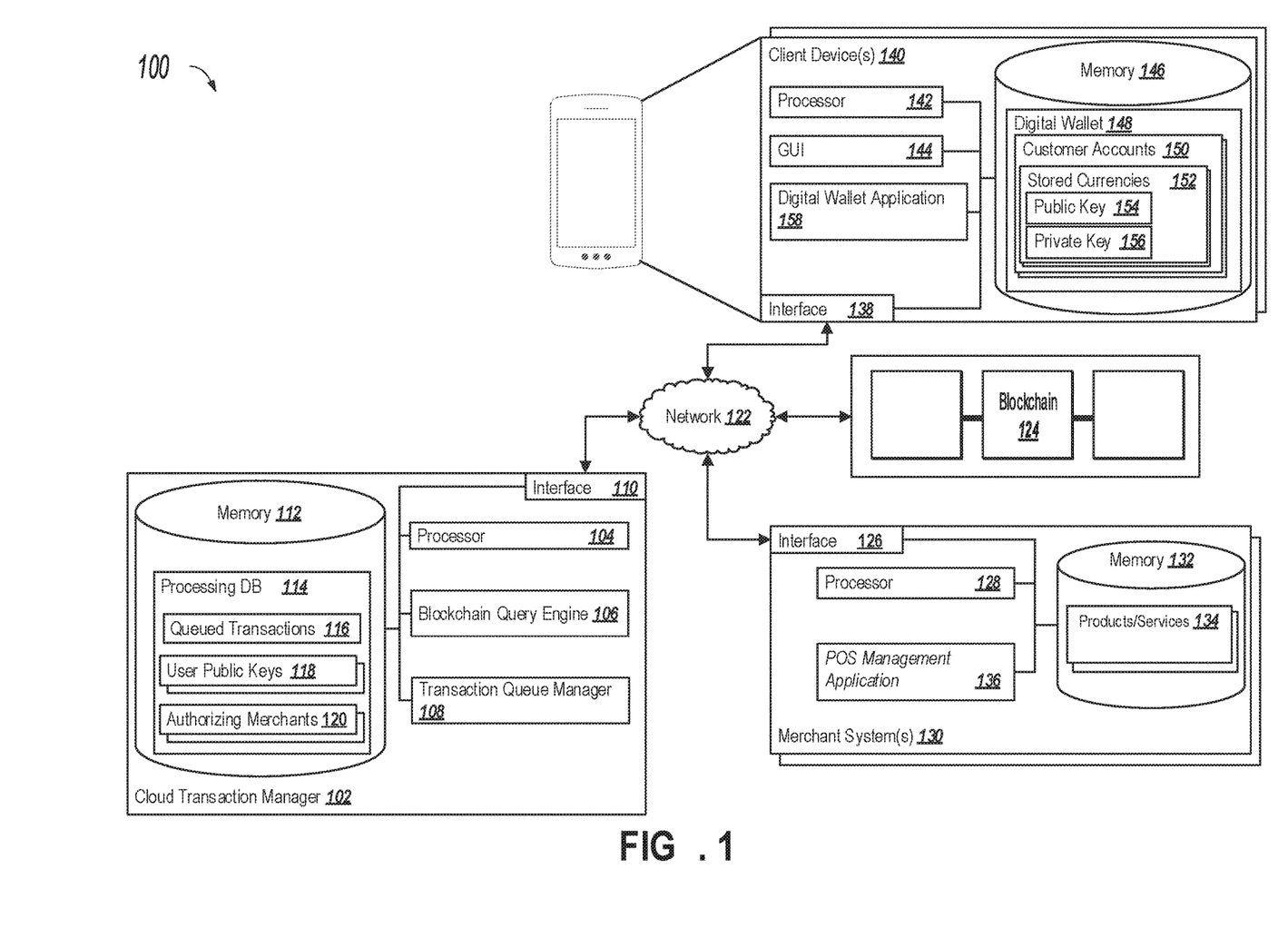
FIG. 1 depicts a block diagram of a system for providing approval for blockchain-based transactions.

Turning to the illustrated example implementation, FIG. 1 is a block diagram illustrating an example system 100 for providing approval for blockchain-based transactions. In general, the system 100 allows the illustrated components to share and communicate information across devices and systems (e.g., cloud transaction manager 102, merchant system(s) 130, and one or more client devices 140, among others) via network 122. As described herein, the cloud transaction manager 102 can be a cloud-based component or system (partially or fully), while in other instances, non-cloud systems can be used. In some instances, non-cloud-based systems, such as on-premise systems, client-server applications, and applications running on one or more client devices, as well as combinations thereof, can use or adapt the processes described herein. Although components are shown individually, in some implementations, functionality of two or more components, systems, or servers can be provided by a single component, system, or server.

As used in the present disclosure, the term "computer" is intended to encompass any suitable processing device. For example, cloud transaction manager 102 or the merchant system(s) 130 can be any computer or processing device such as, for example, a blade server, general-purpose personal computer (PC), Mac® workstation, UNIX-based workstation, or any other suitable device. In other words, the present disclosure contemplates computers other than general-purpose computers, as well as computers without conventional operating systems. Similarly, each merchant system 130 can be any system that can request data and/or interact with the cloud transaction manager 102 or client devices 140. The merchant system 130, in some instances, can be a desktop system, a client terminal, or any other suitable device, including a mobile device, such as a smartphone, tablet, smartwatch, or any other mobile computing device. In general, each illustrated component can be adapted to execute any suitable operating system, including Linux, UNIX, Windows, Mac OS®, Java™, Android™, Windows Phone OS, or iOS™ among others. The merchant system 130 can include one or more specific applications executing on the merchant system 130, or the merchant system 130 can include one or more web browsers or web applications that can interact with particular applications executing remotely from the merchant system 130. In this manner, a point-of-sale (POS) system can be a system which allows transactions for online commerce, in-store commerce, or any other suitable portal for transacting.

System 100 includes a cloud transaction manager 102, one or more merchant systems 130, one or more client devices 140, and at least one blockchain 124. Network 122 facilitates wireless or wireline communications between the components of the system 100 (e.g., between the cloud transaction manager 102, the merchant system(s) 130, or client devices 140, etc.), as well as with any other local or remote computers, such as additional mobile devices, clients, servers, or other devices communicably coupled to network 122, including those not illustrated in FIG. 1. In the illustrated environment, the network 122 is depicted as a single network, but can be comprised of more than one network without departing from the scope of this disclosure, so long as at least a portion of the network 122 can facilitate communications between senders and recipients. In some instances, one or more of the illustrated components (e.g., the memory 112, the blockchain query engine 106, etc.) can be included within or deployed to network 122, or a portion thereof, as one or more cloud-based services or operations. The network 122 can be all or a portion of an enterprise or secured network, while in another instance, at least a portion of the network 122 can represent a connection to the Internet. In some instances, a portion of the network 122 can be a virtual private network (VPN). Further, all or a portion of the network 122 can comprise either a wireline or wireless link. Example wireless links can include 802.11a/b/g/n/ac, 802.20, WiMax, LTE, and/or any other appropriate wireless link. In other words, the network 122 encompasses any internal or external network, networks, sub-networks, or combination thereof operable to facilitate communications between various computing components inside and outside the illustrated system 100. For example, the network 122 can communicate using Internet Protocol (IP) packets, Frame Relay frames, Asynchronous Transfer Mode (ATM) cells, voice, video, data, and other suitable information between network addresses. The network 122 can also include one or more local area networks (LANs), radio access networks (RANs), metropolitan area networks (MANs), wide area networks (WANs), all or a portion of the Internet, and/or any other communication system or systems at one or more locations.

The cloud transaction manager 102 is a system that observes and manages transactions between the client device 140 and the merchant system 130. The cloud transaction manager 102 and its functionality can provide the merchant system 130 with a measure of security and speed, providing approval for transactions prior to them being written into the blockchain 124 based on an analysis of a digital wallet or wallets 148 corresponding to particular users with whom the merchant system 130 is interacting. As illustrated, cloud transaction manager 102 includes a processor 104, a memory 112, a blockchain query engine 106, and a transaction queue manager 108.

Although illustrated as a single processor 104 in FIG. 1, multiple processors can be used according to particular needs, desires, or particular implementations of the system 100. Each processor 104 can be a central processing unit (CPU), an application specific integrated circuit (ASIC), a field-programmable gate array (FPGA), or another suitable component. Generally, the processor 104 executes instructions and manipulates data to perform the operations of the cloud transaction manager 102. Specifically, the processor 104 executes the algorithms and operations described in the illustrated figures, as well as the various software modules and functionality, including the functionality for sending communications to and receiving transmissions from the merchant system 130, client devices 140, the blockchain 124, and to other devices and systems. Each processor 104 can have a single or multiple core, with each core available to host and execute an individual processing thread. Further, the number of, types of, and particular processors 104 used to execute the operations described herein can be dynamically determined based on a number of requests, interactions, and operations associated with the cloud transaction manager 102. In some implementations, the cloud transaction manager 102 can be provided in a containerized computing environment, which allows replication of software on multiple hardware system, in order to scale computing power accordingly with demand. Additionally, in some implementations the cloud transaction manager 102 can be executing on the client device 140, or the merchant system 130, the present disclosure is not limited thereto.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including C, C++, C #, JavaScript, Java™, Visual Basic, assembler, Perl®, Golang, Rust, VB.net, Python, Swift, Kotlin, Ruby, any suitable version of 4GL, as well as others.

Memory 112 of the cloud transaction manager 102 can represent a single memory or multiple memories. The memory 112 can include any memory or database module and can take the form of volatile or non-volatile memory including, without limitation, magnetic media, optical media, random access memory (RAM), read-only memory (ROM), removable media, or any other suitable local or remote memory component. The memory 112 can store various objects or data, including a processing database 114, user and/or account information, administrative settings, password information, caches, applications, backup data, repositories storing business and/or dynamic information, and any other appropriate information associated with the cloud transaction manager 102, including any parameters, variables, algorithms, instructions, rules, constraints, or references thereto. Additionally, the memory 112 can store any other appropriate data, such as VPN applications, firmware logs and policies, firewall policies, a security or access log, print or other reporting files, as well as others. While illustrated within the cloud transaction manager 102, memory 112 or any portion thereof, including some or all of the particular illustrated components, can be located, in some instances, remote from the cloud transaction manager 102, including as a cloud application or repository, a separate cloud application or repository from the cloud transaction manager 102 which, itself, can be a cloud-based system. In some examples, the data stored in memory 112 can be accessible via network 122 and can be obtained by particular applications or functionality of the cloud transaction manager 102. As illustrated and described in greater detail below, memory 112 includes the processing database 114, as well as instructions for executing the blockchain query engine 106 and the transaction queue manager 108 and other applications and functionality of the cloud transaction manager 102.

The processing database 114 can store a set of queued transactions 116. The queued transactions 116 can be stored in a list, a table, or in any other suitable format, and can include transactions that have been approved or are otherwise pending, but that have not yet been written to the blockchain 124. In some implementations, the queued transactions 116 can be stored as a table of key/value pairs. Each queued transaction 116 can be associated with details of the pending transaction, such as a sending party or entity, a receiving party or entity, a quantity of digital assets to be transferred, a date and time of the transfer, a location of one or more entities associated with the transfer at the time of the transaction, information regarding the items transacted, as well as any other suitable and/or relevant information. The processing database 114 can also include and maintain one or more user public keys 118. These user public keys 118 can, in some instances, have been received from one or more client devices 140, such as when registering with the cloud transaction manager 102 or a related service or functionality. The user public keys 118 can be public keys associated with digital assets store within a digital wallet (e.g., the digital wallet application 158 discussed in more detail below), and can permit the cloud transaction manager 102 to identify transactions in the blockchain 124 associated with a particular digital wallet (and thus, the corresponding user).

Authorizing merchants 120 can be stored in the processing database 114 and can include details related to one or more merchant system 130 which have registered or otherwise authorized the cloud transaction manager 102 to perform transaction approvals for transactions involving the respective merchant systems 130. The stored authorizing merchants 120 can include rules or criteria specific to merchants utilizing the cloud transaction manager 102 to perform approvals, and can be defined or updated based on the desired configuration of each particular merchant.

The blockchain query engine 106 is a software application, agent, module, or other component that executes on the cloud transaction manager 102, where the blockchain query engine 106 uses the user public keys 118 to identify transactions in the blockchain associated with a particular digital asset. The blockchain query engine 106 may be an individual or separate component, or may be inherent to or included within the cloud transaction manager 102 itself. By querying transactions associated with a particular user public key 118 associated with a user or customer attempting to complete a transaction with a particular merchant system 130, the blockchain query engine 106 is able to identify or determine a current balance of digital assets available to the digital wallet in the blockchain at the time the transaction is attempted. This current balance accounts for transactions that have been written to the blockchain 124, and therefore, may not be up to date based on pending transactions that are waiting to be written to the blockchain 124.

The transaction queue manager 108 can update and maintain the queued transactions 116. Upon receipt of a request for approval of a transaction, from either a client device 140 or a merchant system 130, the transaction queue manager 108 can identify a particular transaction amount of the transaction and a digital wallet from which the digital asset (e.g., cryptocurrency) is to be withdrawn. The transaction queue manager 108, using the blockchain query engine 106, can determine a current balance associated with the digital wallet based on transactions written in the blockchain. In some implementations, some blockchains may provide an application programming interface (API) which permits entities to directly query the balance associated with a digital asset using the public key of the digital asset. The queued transactions 116 are queried to determine a pending balance associated with the digital wallet based on a total amount of the queued transactions corresponding to the user, but not yet written to the blockchain. For example, a user, using their client device 140, can request approval for a transaction in which the digital wallet associated with the user and client device 140 will spend $100.00 worth of a digital asset. The transaction queue manager 108 can, using the blockchain query engine 106, determine that the digital wallet has $160.00 available based on an analysis of the blockchain. The transaction queue manager 108 can then determine, based on the queued transaction 116 in the processing database 114, that the digital wallet has $50.00 worth of pending transactions, and, therefore, an available remaining balance of $110.00. Based on this information, the transaction for $100.00 can be approved by the cloud transaction manager 102, and the transaction queue manager 108 can then update and add the pending transaction to the queued transactions 116.

The transaction queue manager 108 can periodically use the blockchain query engine 106 to update the pending transactions 116. For example, every time a new block is written to the blockchain 124, the transaction queue manager 108, using the blockchain query engine 106, can query the new block for transactions that are currently stored as queued transactions 116. In some implementations, the blockchain 124 itself can provide updates or notifications to the blockchain query engine 106 when a new block is persisted that contains transactions the cloud transaction manager 102 is tracking. When one or more queued transactions 116 are identified in a newly written block, the corresponding entries in the pending transactions can be removed or deleted from the queued transactions 116. In some implementations, the transaction can then be archived, or stored in a persistent memory for future analytics. In some implementations, the transaction queue manager 108 can send a notification to the client device 140, merchant system 130, or both, indicating that the transaction has been finalized in the blockchain 124 and is no longer pending. Any suitable communication medium or channel can be used for such notifications. Alternatively, if a new block is written and one or more queued transactions 116 that were expected to be written to the blockchain and were not (e.g., a queued transaction that has not been written to a block for the last 3 new blocks), the transaction queue manager 108 can notify the merchant system 130 and the client device 140 that the pending transaction has failed to be confirmed and written. In these implementations, the transaction queue manager 108 can, in some instances, blacklist the client device 140 or digital wallet 148 associated with the transaction, which can prevent further transactions from taking place until corrective measures (e.g., repayment of outstanding debt) are completed. In some cases, the transaction queue manager 108 can further notify regulatory authorities or other entities of the failed transaction.

The interface 110 is used by the cloud transaction manager 102 for communicating with other systems in a distributed environment—including within the system 100—connected to the network 122, including blockchain 124, one or more merchant systems 130 associated with one or more merchants (not shown), one or more client devices 140, and other systems communicably coupled to the cloud transaction manager 102 and/or network 122. Generally, the interface 110 comprises logic encoded in software and/or hardware in a suitable combination and operable to communicate with the network 122 and other components. More specifically, the interface 110 can comprise software supporting one or more communication protocols associated with communications, such that the network 122 and/or interface's hardware is operable to communicate physical signals within and outside of the illustrated system 100. Still further, the interface 110 can allow the cloud transaction manager 102 to communicate with the merchant systems 130 and/or the client devices 140 and other systems, such as one or more blockchains 124 to perform the operations described herein.

As illustrated, one or more merchant systems 130 can be present in the example system 100. Each merchant system 130 can be associated with a particular retailer or service provider, or may be a general system associated with a plurality of retailers and service providers. Each merchant system 130 can include an interface 126 for communication (similar to or different from interface 110), at least one processor 128 (similar to or different from processor 104), a point of sale (POS) management applications 136, and a memory 132 (similar to or different from memory 118).

The memory 132 can store details on various products (e.g., clothing, food, etc.) or services (e.g., subscription service, car wash, etc.). The products and services 134 can have associated prices, and in some cases, sales campaigns, discount offers, and marketing history (volume of transactions, historical prices, etc.). These products and services 134 can be included in or associated with transactions entered into by the users and their client devices 140.

The POS management application 136 can allow the merchant system 130 to interact with customers via client devices 140 to complete their transactions. The POS management application 136 may also be used to register the merchant system 130 with the cloud transaction manager 102, in some instances. In others, a separate component or set of functionality can be used to register with the cloud transaction manager 102. Generally, the POS management application 136 executes to perform the functions and operations of or related to the merchant system 130, and can include third party software or proprietary software that is unique to each merchant system 130. If a customer operating a client device 140 agrees to purchase a product or service 134, the merchant system 130 can, using the POS management applications 136, generate a transaction request payload message to transmit to the cloud transaction manager 102. The transaction request payload message can include details that can be used by the cloud transaction manager 102 to approve the transaction. For example, the transaction request payload message can include a transaction identifier (e.g., a GUID, or a nine digit alphanumeric uniquely identifying the transaction), a transaction amount (e.g., USD, BTC, etc.), a transaction type (e.g., sale, refund, smart contract exchange, etc.), a date and time, and a location of the merchant system, among other transaction details. In some implementations, the transaction payload message includes a transaction amount in a local currency, which can be converted by the cloud transaction manager to a currency associated with the digital asset. The POS management application 136 can further transmit the transaction identifier to the client device 140 of the customer making the transaction. The transaction identifier can be transmitted, for example, via a QR code, or bar code presented at a display of the merchant system 130 (not shown) which is then scanned by an imaging sensor of the client device 140. Alternatively, the transaction identifier can be transmitted via NFC, Wi-Fi, SMS, or other suitable modes of communication. In some implementations, a biometric authorization (e.g., a facial scan, a fingerprint scan, an iris scan, etc.) from the customer can be required to approve the transaction prior to the POS management application 136 transmitting the transaction request payload message to the cloud transaction manager 102. For example, if the client device 140 is a cloud based device, the merchant system 130 can require a biometric input from the customer, which can be provided to the digital wallet 148, allowing the customer to make a transaction from their digital wallet 148 without having a physical device. Once the client device 140 receives the transaction identifier, the device 140 can generate and transmit an approval request message to the cloud transaction manager 102. The approval request message is described in more detail below with reference to the client device 140.

While illustrated as a unique system from client device 140, it is possible that the client device 140 and merchant system 130 can both be on the same physical platform. Further, the client device 140 can act as a merchant system 130, or the merchant system 130 can act as a client device 140, enabling, for example, peer to peer (P2P) transactions. For example, a customer mobile device may be used as a client device 140 to purchase one or more commodities, then the same mobile device can act as a merchant system 130 in the resale of the one or more commodities.

A blockchain 124 can be available to provide a distributed, secure ledger recording transactions between various client devices 140 and merchant systems 130. The blockchain 124 is a decentralized network of nodes which process and verify blocks before adding them to the blockchain. Each block in the blockchain is a set of data including transactions that, when hashed, include the hash of the previous block. In this manner, any alteration of a previously written block in the blockchain will be readily identified, as its hash will no longer point to the previous block. In some implementations, the blockchain 124 is a public blockchain, allowing any computing device with connection to the network to access it and participate as a node in consensus events. In another implementation, the blockchain 124 can be a private or consortium blockchain, in which access to the blockchain is privileged and maintained by one or more administrators. In some instances, private or consortium blockchain can separately control access to view the blockchain and access to participate in the blockchain. For example, a private blockchain network can provide public access to each block, such that any device can access and observe transactions within the blockchain. In this example, the private blockchain can require devices acting as consensus nodes within the blockchain to be registered and authorized by a blockchain administrator prior to participating in consensus cycles. Although depicted as a single blockchain 124 in FIG. 1, system 100 can communicate or provide rapid approval services for multiple blockchains without departing from the scope of this disclosure.

System 100 can include one or more client devices 140. Each client device 140 can be associated with a particular customer or user who will send or transact a digital asset during a transaction with one or more merchant systems 130. Each client device 140 can include an interface 138 (similar to or different from interface 110), a processor 142 (similar to or different from processor 104), a memory 146 (similar to or different from memory 112), including a digital wallet 148. Each client device 140 can further include a graphical user interface (GUI) 144 and a digital wallet application 158. In some implementations, the client device 140 is a cloud based system, accessed by the user via a web browser, or the merchant device 130.

GUI 144 of the client device 140 interfaces with at least a portion of the system 100 for any suitable purpose, including generating a visual representation of any particular application, such as digital wallet application 158, and/or the content associated with any components of the client device 140. In particular, the GUI 144 can be used to present a current status of the digital wallet 148, pending transactions, alerts associated with actions taken by a user (e.g., including notifying the user of the status of a pending transaction), and to otherwise interact and present information associated with one or more applications and/or operations of the client device 140. GUI 144 can also be used to view and interact with various web pages, applications, and web services located local or external to the client device 140. Generally, the GUI 144 provides the user with an efficient and user-friendly presentation of data provided by or communicated within the system 100. The GUI 144 can comprise a plurality of customizable frames or views having interactive fields, pull-down lists, and buttons operated by the user. In general, the GUI 144 is often configurable, supports a combination of tables and graphs (bar, line, pie, status dials, etc.), and is able to build real-time portals, application windows, and presentations. Therefore, the GUI 144 contemplates any suitable graphical user interface, such as a combination of a generic web browser, a web-enable application, intelligent engine, and command line interface (CLI) that processes information in the platform and efficiently presents the results to the user visually.

Digital wallet application 158 can be a software application executing on the client device 140 or on a remote server accessed via the client device 140, which manages and performs operations necessary for use and maintenance of the digital wallet 148 on the client device 140. Digital wallet 148 maintains one or more customer accounts 150, where each customer account can be associated with one or more stored currencies 152. Stored currencies 152 can be, for example, cryptocurrencies (e.g., Bitcoin, Ethereum, etc.) or other digital assets (e.g., electronic titles, smart contracts, etc.). Each stored currency 152 has a public key 154 and a private key 156 associated with it as well as a unique address. The address can be a hashed version of the public key 154, such that transactions to or from that address on the blockchain can be confirmed using the public key 154. In some implementations, the digital wallet address can be the same as the public key 154. Private key 156 is required to authorize transactions from a particular stored currency 152, thus the digital wallet 148 can only spend currencies using the private key 156, which is stored locally on the client device 140 and is securely maintained.

Digital wallet application 158 can maintain the digital wallet 148, as well as use the private key 156 to initiate transfer of digital assets from the digital wallet 148 to receiving entities (e.g., merchant system 130). In some instances, the digital wallet application 158 has access to peripheral devices (not shown) of the client device 140. For example, the digital wallet application 158 can activate a camera or other image sensor on the client device 140, in order to scan a QR or bar code and receive a transaction identifier from a merchant system 130. In another example, the digital wallet application 158 can energize an NFC chip (not shown) on the client device 140, or otherwise communicate via the interface 138.

While portions of the elements illustrated in FIG. 1 are shown as individual modules that implement the various features and functionality through various objects, methods, or other processes, the software can instead include a number of sub-modules, third-party services, components, libraries, and such, as appropriate. Conversely, the features and functionality of various components can be combined into single components as appropriate.

Figure 2A:
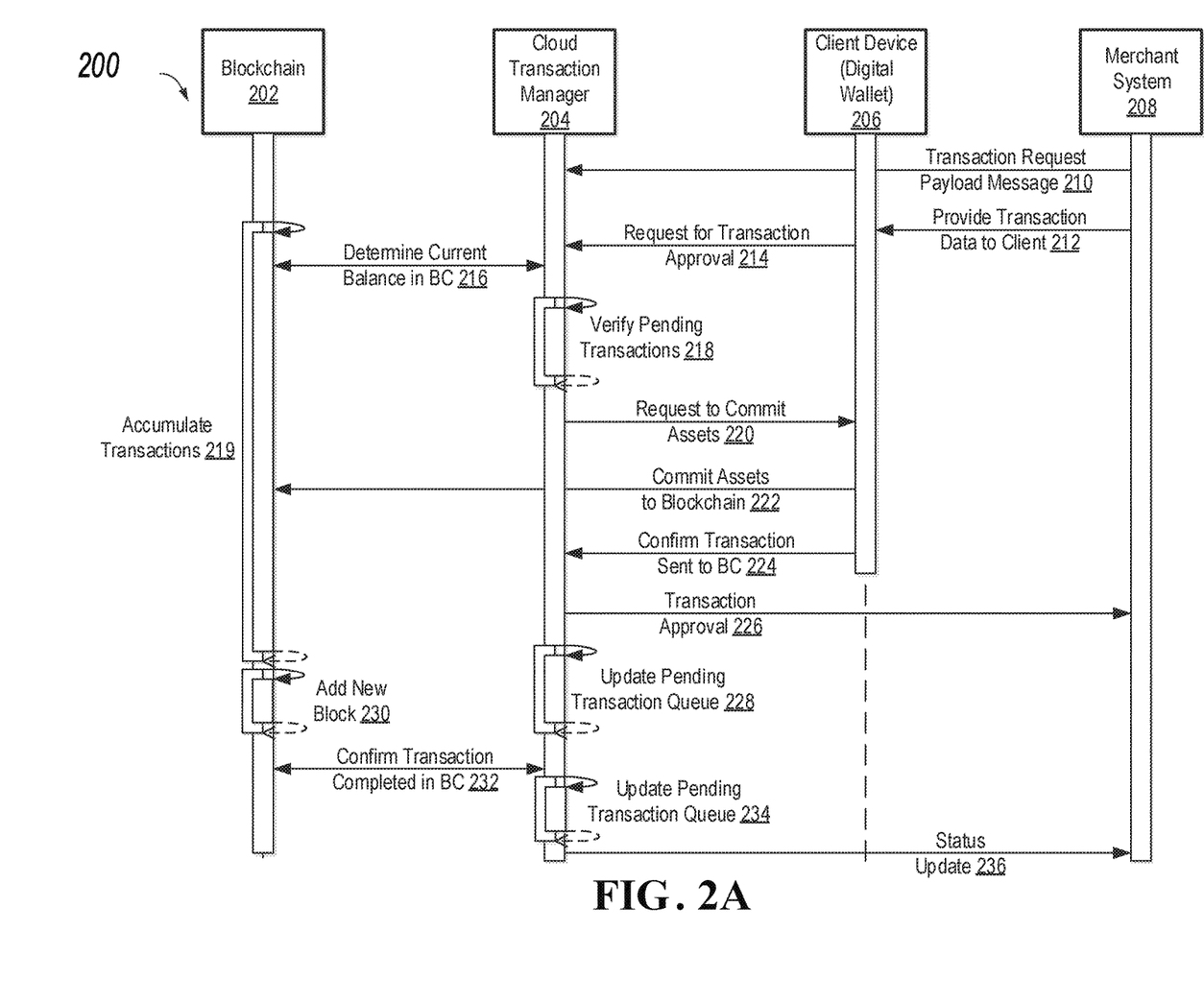
FIG. 2A is a swim-lane diagram describing an example method for approving blockchain-based transactions.

FIG. 2 depicts a swim-lane diagram describing an example method for approving blockchain transactions. In some implementations, the cloud transaction manager 204 is similar to the cloud transaction manager 102 as described with reference to FIG. 1. In some implementations, the blockchain 202, digital wallet 206, and merchant system 208, are similar to or the same as the blockchain 124, client device 140, and merchant system 130 as described with reference to FIG. 1.

In some implementations, after an agreement is reached to perform a transaction between a digital wallet 206 and a merchant system 208 (e.g., a customer scans a commodity for purchase at a merchant kiosk, or a seller and a buyer agree upon a price for a service), the merchant system 208 sends a transaction request payload message at 210 to the cloud transaction manager 204. The transaction payload message request can include any details necessary for the cloud transaction manager 204 to perform an approval of the transaction. For example, the transaction request payload message can include a transaction amount, a transaction identifier (e.g., a unique alphanumeric code), a merchant identifier which identifies the party to receive a digital asset, a wallet identifier or unique identifier of the party to send the digital asset, a type of transaction (e.g., sale, refund, loan, etc.). The transaction request payload message can include additional information and metadata, such as the date and time, a location of one or more parties involved in the transaction, or a time limit for the transaction to be approved within. In some implementations, the transaction request payload message includes the public key associated with the digital wallet associated with the digital assets to be sent in the transaction, and a request for transaction approval, as described in further detail below with respect to FIG. 2B. In some implementations, the cloud transaction manager 204 records the transaction request payload message, and then awaits an approval request from a digital wallet or client device 206. In another implementation, the cloud transaction manager 204 immediately begins the approval process upon receipt of the transaction request payload message.

After sending the transaction payload request message, the merchant system, at 212, provides transaction data to the digital wallet 206. For example, the merchant system 208 can provide the transaction identifier to the client device via a QR code, or other communication channel, which may not have the bandwidth capability to support the full transaction request payload message, but some reduced transaction data. In some implementations, the merchant system 208 simply provides the transaction identifier to the client device 206. In another implementation, the merchant system 208 provides the transaction identifier and a transaction amount. In yet another implementation, the entire transaction request payload message is transferred to the client device 206.

At 214, upon receiving transaction data (and optionally, a final approval by the client device 206), the client device 206 can send a request for transaction approval to the cloud transaction manager 204. The request for transaction approval includes the public key of the digital asset stored within the digital wallet associated with the client device 206. The public key of the digital asset allows the cloud transaction manager 204 to verify the existing balance of the digital asset the digital wallet currently owns in the blockchain 202. The request for transaction approval also includes transaction details to be used by the cloud transaction manager 204 to identify the transaction to approve. In some implementations, the request for transaction approval includes the transaction identifier (e.g., the public key of the digital asset having been transmitted earlier in the transaction request payload message). In another implementation, the request for transaction approval includes the transaction identifier and the public key of the digital wallet. The request for transaction approval can contain additional information in some instances. For example, the request for transaction approval can include a date, time, or location of the client device 206. In another example, the request for transaction approval can include a digitally signed certificate from the client device 206 and/or the merchant system 208, where the certificate can verify that all parties have agreed to the transaction. In some implementations, the date and time of the request for transaction approval can be compared to a date and time of the transaction request payload message to help avoid or minimize risk of fraud. In some implementations, the location of the client device 206 can be compared with a location of the merchant system 208 to further verify both parties have agreed to the transaction.

At 216, the cloud transaction manager 204, using the public key of the digital wallet, identifies a current balance of the digital asset from the underlying blockchain. With the public key of the digital asset, the cloud transaction manager 204 can identify all transactions associated with that digital wallet in the blockchain 202, and can calculate a current balance of digital assets owned by the digital wallet based on the transactions written to the blockchain 202.

After determining a current balance of the digital asset stored within the digital wallet, the cloud transaction manager verifies pending transactions that have not yet been written to the blockchain at 218. Many blockchains 202 accumulate a number of transactions over a predetermined period of time (219). In some implementations, blockchain 202 accumulates a predetermined number of transactions. Because this accumulation process can take some time, the cloud transaction manager 204 needs to be able to intelligently approve the transaction without it being written into the blockchain 202. The cloud transaction manager 204 can maintain a pending transaction queue, which can be a record of transactions that have been approved by the cloud transaction manager 204 or are otherwise waiting to be written into the blockchain, but that have yet to be written to the blockchain. In other words, the cloud transaction manager 204 can act as an intermediary to the blockchain 202, and can store and manage transactions and information to be written to the blockchain 202 before such writing is actually performed. At 218, the cloud transaction manager 204 can determine an amount, if any, associated with pending transactions in the pending transaction queue that are associated with the digital asset. Once an amount of pending transactions is determined, the cloud transaction manager 204 can determine an available balance associated with the digital asset, or an amount of the digital asset that the digital wallet is able to spend without overcommitting. For example, if it is determined that the current balance within the digital wallet is 200 coins of a digital asset written in the blockchain, and that the digital wallet further has 150 coins of the asset of pending transactions to another entity, as well as 25 coins of the asset in a pending deposit to the digital wallet, the cloud transaction manager 204 can determine that the digital wallet has an available balance of the digital asset of 200−150+25=75 coins. Therefore, in this instance, if the request for transaction approval is for a transaction of 75 coins or less, the cloud transaction manager can approve the transaction prior to the transaction being written to the blockchain. The present disclosure is not limited to a particular blockchain architecture or particular digital asset. While the expression "coins" is used generically, it is not a departure from this disclosure to consider the exchange of smart contracts, certificates representing real world assets, or any other suitable digital asset for exchange in a transaction as well as cryptocurrencies.

Prior to providing approval for the transaction, at 220 the cloud transaction manager 204 sends a request to commit message to the client device 206. Client device 206, with the request to commit message providing verification that the transaction will be approved, can then initiate the transaction (222) using its private key to send the desired transaction amount to the merchant system 208. Once the transaction is submitted to the blockchain, the client device 206 can reply, at 224, to the cloud transaction manager 204 with a confirmation message indicating the transaction has initiated to be committed to the blockchain.

Upon receipt of the confirmation message from the client device 206, the cloud transaction manager 204 can approve the transaction, and send the transaction approval to the merchant system 208. Upon receipt of the approval, the merchant system 208 can conclude its business with the client device 206. It should be noted that the transaction approval message at 226 can be sent prior to the transaction being written into the blockchain 202. The blockchain 202 can still be accumulating transactions and may not persist the initiated transaction to a new block in the blockchain 202 for, in some instances, several minutes or longer.

The cloud transaction manager 204 can also update the pending transaction queue with the newly approved transaction (228). In some instances, while illustrated as occurring after transmission of the transaction approval message, the pending transaction queue can be updated before sending the transaction approval message, or simultaneously with sending the message. The approved transaction, including the amount, the sender (e.g., client device 206), and the receiver (e.g., merchant system 208) are stored in the pending transaction queue. In some implementations, additional information is also stored in the pending transaction queue. For example, date and time, location, estimated time to be verified, etc.

At some later time, when the blockchain 202 finishes accumulating transactions it will add a new block at 230. The new block should include transactions that were previously initiated for persistence in the blockchain 202. Once a new block is added, the cloud transaction manager 204 can query or search the new block for any transactions that might be in the pending transaction queue. The cloud transaction manager 204 will confirm, at 232, the newly approved transaction is in the new block. If it is confirmed to be present in the new block, the transaction can be removed from the pending transaction queue and the queue can be updated a second time (234). In some implementations, the cloud transaction manager 204 will allow a certain number of new blocks (e.g., 2, 4 or other) to be added to the blockchain 202 without a pending transaction, before the cloud transaction manager 204 determines the transaction has not been completed. In some implementations, if the recently approved transaction is not present in the next new block in the blockchain, the cloud transaction manager 204 determines the transaction has not been completed.

Following the determination that the transaction has either been completed, or has not, the cloud transaction manager 204 can provide a status update to the merchant system 208 at 236. Optionally, the cloud transaction manager 204 can provide the status update to the client device as well as, or instead of, the merchant system 208. If the transaction has been verified (e.g., written into a new block in the blockchain), the cloud transaction manager 204 can simply notify the merchant system 208, or in some implementations, can take no action, where a status update is not sent unless the transaction is not verified. If the transaction has failed to be written into the blockchain, an assumption can be made that the digital wallet did not correctly commit assets to the blockchain, either maliciously or through other error. In some such instances, the cloud transaction manager 204 can notify the merchant system 208 that the transaction has not been completed. Additionally, in some implementations, the cloud transaction manager 204 can add the client device 204 or its associated digital wallet to a blacklist, which can prevent or otherwise reject any future transactions associated with the digital wallet until the failed transaction is successfully written to the blockchain or other remedial measures are taken to clear the issue.

Figure 2B:
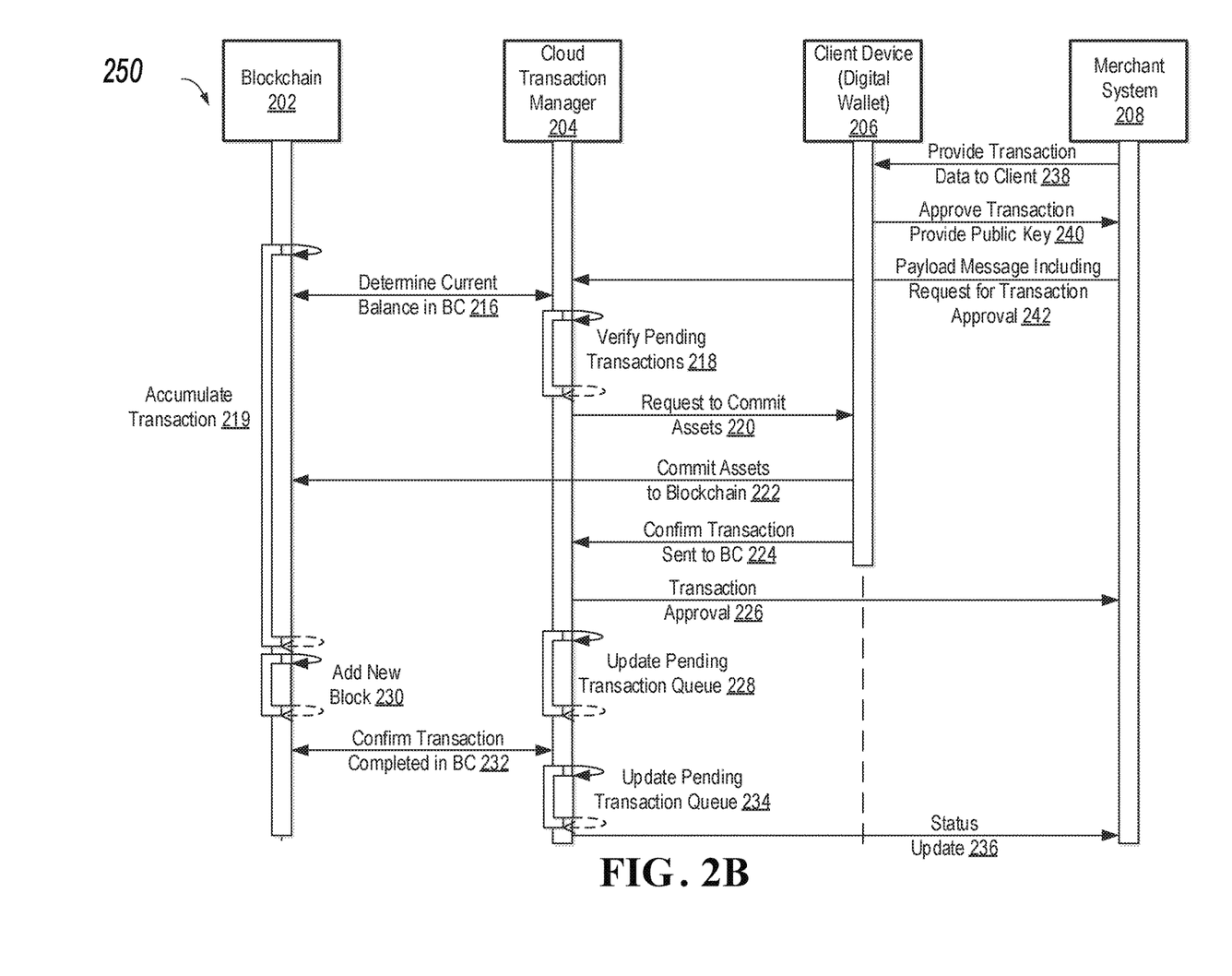
FIG. 2B is a swim-lane diagram describing an alternate example method for approving blockchain-based transactions.

FIG. 2B illustrates an alternate example method 250 for approving blockchain-based transactions. The method of FIG. 2B is largely similar to the method in FIG. 2A, with some differences in the initial interactions between the client device 206 and the merchant system 208. This alternate method allows the merchant system to initiate approval from the cloud transaction manager 204, which can be implemented, for example, in a situation where it is desirable to minimize network communications with cloud transaction manager 204.

At 238, the merchant system provides transaction data to the client device 206. The transaction data can be transaction details needed for the client device 206 to consent to the transaction. In some implementations, the merchant system 208 provides the transaction identifier to the client device 206. In another implementation, the merchant system provides the transaction identifier and a transaction amount.

If the client device 206 consents to the transaction, it can respond to the merchant system with an approval message that includes the public key of the digital wallet at 240. In some implementations, the client device can confirm the user consents to the transaction by requiring a biometric verification (e.g., fingerprint, iris scan, facial scan, etc.) or other confirmation that a user associated with the client device 206 has consented to the transaction.

At 242, after the merchant system 208 has received approval and the public key of the digital wallet, the merchant system can form and transmit the transaction request payload message to the cloud transaction manager 204. This payload message can be similar to the transaction request payload message as described with respect to FIG. 2A at 210 above, except it contains the public key of the digital wallet. In this instance, the cloud transaction manager will immediately begin the approval process, similarly to the described processes in FIG. 2A. The method described in FIG. 2B requires only a single entity (e.g., the merchant system 208) to initiate the transaction with the cloud transaction processor 204. In the method described in FIG. 2A, both the merchant system 208 (providing the transaction request payload message) and the client device 206 (sending the request for approval) are required to initiate a transaction approval with the cloud transaction manager 204. In some implementations, the digital wallet 206 may be a cloud wallet, and the user may instead interface with the merchant system 208, providing a biometric authorization (e.g., fingerprint, iris scan, facial scan, etc.) to allow the merchant system 208 to pull required information (e.g., public key and transaction approval) from the cloud based digital wallet 206.

Figure 3:
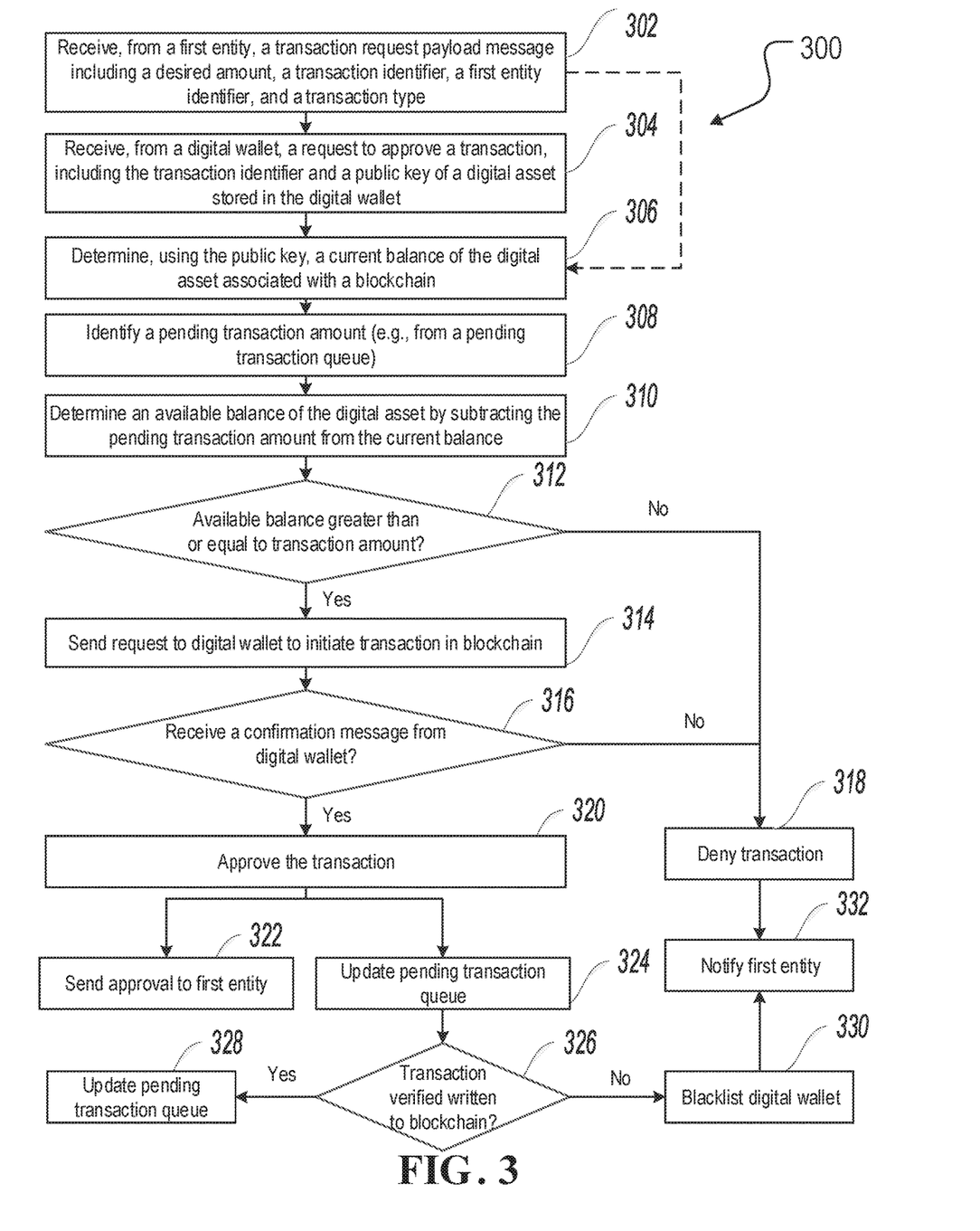
FIG. 3 is a flowchart describing a method for providing approval for blockchain-based transactions.

FIG. 3 is a flow diagram of an example method 300 for approving blockchain-based transactions. FIG. 3 is an example method illustrated from the point of view of a cloud transaction manager, such as cloud transaction manager 102 of FIG. 1. However, it will be understood that method 300 may be performed, for example, by any other suitable system, environment, software, and hardware, or a combination of systems, environments, software, and hardware as appropriate. In some instances, method 300 can be performed by the system 100, or portions thereof, described in FIG. 1, as well as other components or functionality described in other portions of this description. In other instances, method 300 may be performed by a plurality of connected components or systems. Any suitable system(s), architecture(s), or application(s) can be used to perform the illustrated operations.

In one instance, method 300 describes a method performed by a cloud transaction manager which includes a communications module, at least one memory, and at least one hardware processor interoperably coupled with the at least one memory and the communications module. The memory may store instructions that instruct the at least one hardware processor to perform particular operations.

At 302, the cloud transaction manager receives, from a first entity (e.g., a merchant system or other entity which is to be the recipient in a transaction), a transaction payload message. The transaction request payload message can include a transaction amount, a transaction identifier, one or more entity identifiers (e.g., an identifier identifying the first entity, and an identify identifying a second entity which is to be a sender in the transaction), and a transaction type (e.g., sale, refund, lease, etc.). In some implementations, where the transaction request payload message further includes a public key of a digital asset stored in a digital wallet, method 300 may proceed directly to 306. Otherwise, method 300 proceeds to 304.

At 304, the cloud transaction manager receives, from a digital wallet, a request to approve the transaction. The request can include the public key of the digital wallet, as well as the transaction identifier. In some implementations, the request includes additional data, such as date, location, time, or other suitable metadata.

At 306, the cloud transaction manager determines a current balance of the digital wallet associated with the blockchain. The current balance can be determined using the public key of the digital asset to confirm all inbound and outbound transactions from the digital wallet and aggregating them to yield the current balance.

At 308, a pending transaction amount is identified for the digital asset. The pending transaction amount can be identified from a pending transaction queue maintained by the cloud transaction manager. In some implementations, the cloud transaction manager uses the public key of the digital asset as an identifier to query the pending transaction queue. In some implementations, a third party system maintains the pending transaction queue and the cloud transaction manager merely queries it (e.g., through an API) to determine the pending transaction amount. The pending transaction amount is an amount of a digital asset (e.g., cryptocurrency) that has been initiated to be committed to the blockchain, but not yet written into or verified by the blockchain. In some implementations, the cloud transaction manager maintains the pending transaction queue, and exposes it (e.g., via an API) to other third party systems which can provide separate analysis.

At 310, the cloud transaction manager determines an available balance associated with the digital asset. In some implementations, the available balance is the pending balance identified at 308 subtracted from the current balance determined at 306.

At 312, if the available balance is greater than or equal to the transaction amount, method 300 can proceed to 314. Alternatively, if the available balance is less than the transaction amount, the cloud transaction manager can deny the transaction (318) and notify the first entity that the transaction is not approved (332). In some implementations, method 300 ends after the transaction is denied, or after the transaction is reattempted a certain number of times. In some other implementations, after the transaction is denied, method 300 can return to 304 and the transaction approval can be reattempted (e.g., after the digital wallet receives more of a digital asset in a separate transaction).

At 314, the cloud transaction manager sends a request to the digital wallet indicating that the transaction is to be approved, and requesting that the digital wallet commit the transaction to the blockchain. The digital wallet can then initiate commitment of the transaction and send a confirmation message indicating it has done so.

At 316, if the cloud transaction manager does not receive a confirmation message (e.g., before a predetermined time elapses or some other condition is met), the cloud transaction manager can deny the transaction (318).

If a confirmation message is received, then at 320, the cloud transaction manager can approve the transaction. Upon approval of the transaction, the cloud transaction manager can send an approval message to the first entity (322) allowing the first entity to conclude its transaction with the digital wallet, in many cases prior to the transaction being written in the blockchain.

Separately, the cloud transaction manager at 324 updates the pending transaction queue to include the newly approved transaction. This ensures the cloud transaction manager is prepared to receive additional transactions from the digital wallet and can accurately determine the available balance associated with the digital asset (310). In implementations where the pending transaction queue is maintained by a third party or separate system, the cloud transaction manager can send a message to the third party or system indicating it has approved the transaction.

At 326, after updating the pending transaction queue, the cloud transaction manager can monitor new blocks added to the blockchain. When a new block is added, the cloud transaction manager can verify whether or not the newly approved transaction has been added to the blockchain. If the newly approved transaction has been written into the blockchain, at 328, the cloud transaction manager can update the pending transaction queue, removing the transaction from the queue or marking it as completed and storing it in an archive. If the cloud transaction manager is unable to verify the transaction in the blockchain (e.g., after a new block is added, or after 24 hours, etc.), the cloud transaction manager, at 330, can blacklist the public key of the digital asset, or the entire digital wallet and refuse to approve future transactions associated with the digital wallet. In some implementations, the cloud transaction manager further notifies regulatory authorities or otherwise publishes the address of the fraudulent digital wallet.

At 332, whether the transaction was denied or unable to be verified, the cloud transaction manager notifies the first entity of the status of the transaction. In some implementations, this is done via push messaging, email, SMS, or other text based communication.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or perform additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A computer-implemented method, the method comprising:
receiving, at a cloud transaction manager and from a first entity, a transaction request payload message comprising a desired transaction amount, a transaction identifier, a first entity identifier, and a transaction type;
receiving, at the cloud transaction manager and from a client digital wallet, a request for approval of a transaction comprising the transaction identifier and a public key of a digital asset stored within the client digital wallet;

identifying, by the cloud transaction manager, a pending transaction amount associated with the digital asset;

determining, by the cloud transaction manager, an available balance of the digital asset;

in response to determining that the available balance is at least equal to the desired transaction amount, sending, by the cloud transaction manager, a request to the client digital wallet to initiate persistence of the transaction to a blockchain; and in response to receiving a message from the client digital wallet indicating persistence of the transaction to the blockchain has been initiated:

approving the transaction;

sending, after approval of the transaction and prior to the approved transaction being written to the blockchain, a transaction approval message to the first entity;

updating a pending transaction queue associated with the digital asset with the approved transaction;

performing a verification, by the cloud transaction manager, that the approved transaction is written to the blockchain; and in response to verifying that the approved transaction is written to the blockchain, removing the approved transaction from the pending transaction queue associated with the digital asset.

2. The computer-implemented method of claim 1, wherein the pending transaction amount is identified from the pending transaction queue, wherein the pending transaction queue is maintained by the cloud transaction manager, and wherein the first entity is a merchant point-of-sale system and wherein the merchant point-of-sale system is registered with the cloud transaction manager.

3. The computer-implemented method of claim 1, wherein the available balance is determined by subtracting the pending transaction amount from a current balance of the client digital asset associated with the blockchain, wherein the current balance of the digital asset is determined using the public key of the digital asset.

4. The computer-implemented method of claim 1, wherein in response to determining the available balance is less than the desired transaction amount, denying, by the cloud transaction manager, the transaction.

5. The computer-implemented method of claim 1, wherein in response to failing to verify that the approved transaction is written to the blockchain, placing, by the cloud transaction manager, the client digital wallet on a blacklist, wherein the blacklist prevents further transactions from the client digital wallet.

6. The computer-implemented method of claim 1, wherein the client digital wallet is associated with a mobile device, and wherein the request for approval of the transaction further comprises location information of the mobile device and the location information of the mobile device is compared to a location of the first entity.

7. The computer-implemented method of claim 6, wherein the transaction request payload message further comprises date and time data associated with the transaction.

8. The computer-implemented method of claim 6, wherein the transaction identifier was transmitted to the client digital wallet by scanning of a bar code or QR code by an imaging sensor associated with the mobile device.

9. The computer-implemented method of claim 6, wherein the transaction identifier was transmitted to the client digital wallet using near-field communications.

10. A non-transitory computer readable storage medium storing instruction that, when executed by at least one processor, cause the at least one processor to perform operations comprising:

receiving, at a cloud transaction manager and from a first entity, a transaction request payload message comprising a desired transaction amount, a transaction identifier, a first entity identifier, and a transaction type;

receiving, at the cloud transaction manager and from a client digital wallet, a request for approval of a transaction comprising the transaction identifier and a public key of a digital asset stored within the client digital wallet;

identifying, by the cloud transaction manager, a pending transaction amount associated with the digital asset;

determining, by the cloud transaction manager, an available balance of the digital asset;

in response to determining that the available balance is at least equal to the desired transaction amount, sending, by the cloud transaction manager, a request to the client digital wallet to initiate persistence of the transaction to a blockchain; and in response to receiving a message from the client digital wallet indicating persistence of the transaction to the blockchain has been initiated:

approving the transaction;

sending, after approval of the transaction and prior to the approved transaction being written to the blockchain, a transaction approval message to the first entity;

updating a pending transaction queue associated with the digital asset with the approved transaction;

performing a verification, by the cloud transaction manager, that the approved transaction is written to the blockchain; and in response to verifying that the approved transaction is written to the blockchain, removing the approved transaction from the pending transaction queue associated with the digital asset.

11. The non-transitory medium of claim 10, wherein the pending transaction amount is identified from the pending transaction queue, wherein the pending transaction queue is maintained by the cloud transaction manager, and wherein the first entity is a merchant point-of-sale system and wherein the merchant point-of-sale system is registered with the cloud transaction manager.

12. The non-transitory medium of claim 10, wherein the available balance is determined by subtracting the pending transaction amount from a current balance of the client digital asset associated with the blockchain, wherein the current balance of the digital asset is determined using the public key of the digital asset.

13. The non-transitory medium of claim 10, wherein in response to failing to verify that the approved transaction is written to the blockchain, placing, by the cloud transaction manager, the client digital wallet on a blacklist, wherein the blacklist prevents further transactions from the client digital wallet.

14. The non-transitory medium of claim 10, wherein the client digital wallet is associated with a mobile device, and wherein the request for approval of the transaction further comprises location information of the mobile device and the location information of the mobile device is compared to a location of the first entity.

15. A system for approving transactions comprising:
one or more processors;
one or more tangible, non-transitory media operably connectable to the one or more processors and storing instructions that, when executed, cause the one or more processors to perform operations comprising:
receiving, at a cloud transaction manager and from a first entity, a transaction request payload message comprising a desired transaction amount, a transaction identifier, a first entity identifier, and a transaction type;
receiving, at the cloud transaction manager and from a client digital wallet, a request for approval of a transaction comprising the transaction identifier and a public key of a digital asset stored within the client digital wallet;
identifying, by the cloud transaction manager, a pending transaction amount associated with the digital asset;
determining, by the cloud transaction manager, an available balance of the digital asset;
in response to determining that the available balance is at least equal to the desired transaction amount, sending, by the cloud transaction manager, a request to the client digital wallet to initiate persistence of the transaction to a blockchain; and
in response to receiving a message from the client digital wallet indicating persistence of the transaction to the blockchain has been initiated:
approving the transaction;
sending, after approval of the transaction and prior to the approved transaction being written to the blockchain, a transaction approval message to the first entity;
updating a pending transaction queue associated with the digital asset with the approved transaction;
performing a verification, by the cloud transaction manager, that the approved transaction is written to the blockchain; and
in response to verifying that the approved transaction is written to the blockchain, removing the approved transaction from the pending transaction queue associated with the digital asset.

16. The system of claim 15, wherein the pending transaction amount is identified from the pending transaction queue, wherein the pending transaction queue is maintained by the cloud transaction manager, and wherein the first entity is a merchant point-of-sale system and wherein the merchant point-of-sale system is registered with the cloud transaction manager.

17. The system of claim 15, wherein the available balance is determined by subtracting the pending transaction amount from a current balance of the client digital asset associated with the blockchain, wherein the current balance of the digital asset is determined using the public key of the digital asset.

18. The system of claim 15, wherein in response to failing to verify that the approved transaction is written to the blockchain, placing, by the cloud transaction manager, the client digital wallet on a blacklist, wherein the blacklist prevents further transactions from the client digital wallet.

19. The system of claim 15, wherein the client digital wallet is associated with a mobile device, and wherein the request for approval of the transaction further comprises location information of the mobile device and the location information of the mobile device is compared to a location of the first entity.

20. The system of claim 19, wherein the transaction identifier was transmitted to the client digital wallet by scanning of a bar code or QR code by an imaging sensor associated with the mobile device.

* * * * *